3,417,118
BICYCLIC FERROCENES

Richard A. Schnettler, Milwaukee, and John T. Suh and Claude I. Judd, Mequon, Wis., assignors to Colgate-Palmolive Company, New York, N.Y., a corporation of Delaware
No Drawing. Filed Sept. 26, 1966, Ser. No. 581,735
6 Claims. (Cl. 260—439)

This application relates to novel ferrocene derivatives, processes of preparing them and uses for such compounds. Ferrocene is the commonly accepted name for dicyclopentadienyliron or biscyclopentadienyliron.

The novel compounds of the present invention may be represented by the following formulae:

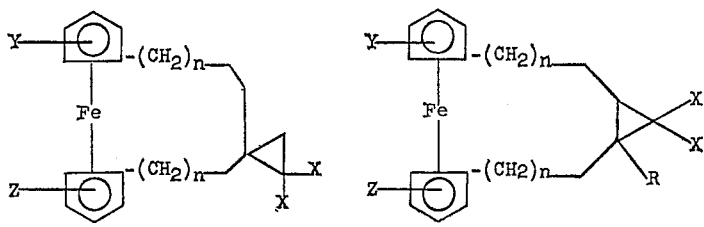

wherein R is hydrogen, an alkyl having 1 to 8 carbon atoms as methyl, ethyl, isopropyl, butyl, hexyl and an aryl, particularly phenyl or a nuclear substituted phenyl such as a chlorophenyl, or an aralkyl, particularly a phenyl-lower alkyl such as benzyl, phenethyl, phenylisopropyl and diphenylmethyl; X is hydrogen, bromo or chloro, n is 0 or 1; and Y and Z are preferably hydrogen, but may also be halogen such as chloro or bromo, trifluoromethyl or lower alkyl.

The compounds of the present invention may be conveniently prepared from a β-keto-1,1'-polymethyleneferrocene of the formula

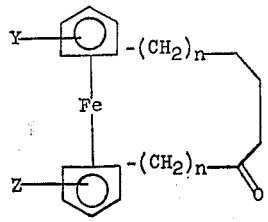

in which all symbols are as previously described.

The ketones employed as starting materials may be conveniently prepared by adding ferrocene portionwise to a mixture of N-methyl formanilide and phosphorus oxychloride. The mixture is treated with sodium acetate and stirred, and the resulting mixture extracted with ether, and the formylferrocene isolated from the ether extract. The formylferrocene is then treated with a dispersion of 50% sodium hydride and triethylphosphonoacetate in dried 1,2-dimethoxyethane with stirring for about 20 minutes at 20–25° C. The reaction mixture is diluted with water and extracted with ether. The ethyl β-(1-ferrocenyl)acrylate, which is isolated from the ethereal extract, is then hydrogenated under standard hydrogenation conditions in the presence of an 85% platinum oxide catalyst, and the reaction mixture filtered to yield ethyl β-(1-ferrocenyl) propionate. The propionate is heated with ethanolic sodium hydroxide at 80° C. for about one hour, the mixture cooled, diluted and acidified with glacial acetic acid to precipitate β-ferrocenylpropionic acid. The acid is first treated with trifluoroacetic anhydride in anhydrous dichloromethane at 0° C., and then treated with 10% sodium hydroxide solution to yield an α-keto-1,1'-trimethylene ferrocene. [Rinehart and Curby, JACS 79, 3290 (1957)].

The α-keto-1,1'-trimethylene ferrocene may then be treated with a mixture of N-methyl-N'-nitro-N-nitrosoquanidine and an alkali hydroxide, such as potassium hydroxide, in ether to form the corresponding β-keto-1,1'-tetramethyleneferrocene. The penta and hexa derivatives may be formed in a similar manner.

The process may be illustrated as follows:

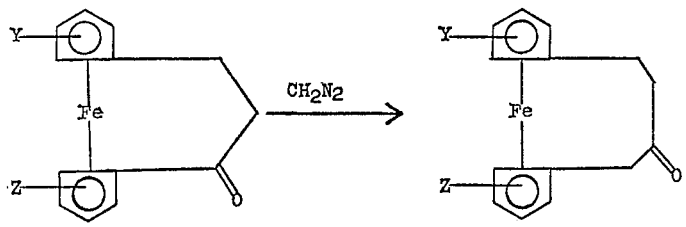

in which Y and Z are as previously described and represent groups which do not interfere with or partake in the reactions.

The β-keto-1,1'-methyleneferrocenes are the basic starting material for the preparation of both the compounds of Formula 1 and those of Formula 2. For example, the compounds of Formula 1 in which n is 0 are conveniently prepared by treating the β-keto-1,1'-tetramethylene ferrocene with methyltriphenylphosphonium bromide and butyl lithium under nitrogen to form the corresponding β - methylene - 1,1' - tetramethyleneferrocene. The thus formed β-methylene derivative may then be treated with an ethyl trihaloacetate such as ethyl trichloroacetate in the presence of a suitable catalyst, such as sodium methoxide, to form the corresponding spiro[2,2-dichlorocyclopropane-1,β-(1,1'-tetramethyleneferrocene)] which upon treatment with lithium aluminum hydride yields the corresponding spiro[cyclopropane-1,β - (1',1''-tetramethyleneferrocene)]. The thus obtained ketone can be then treated in the manner described to form the compouds of Formula 1.

The process may be illustrated as follows:

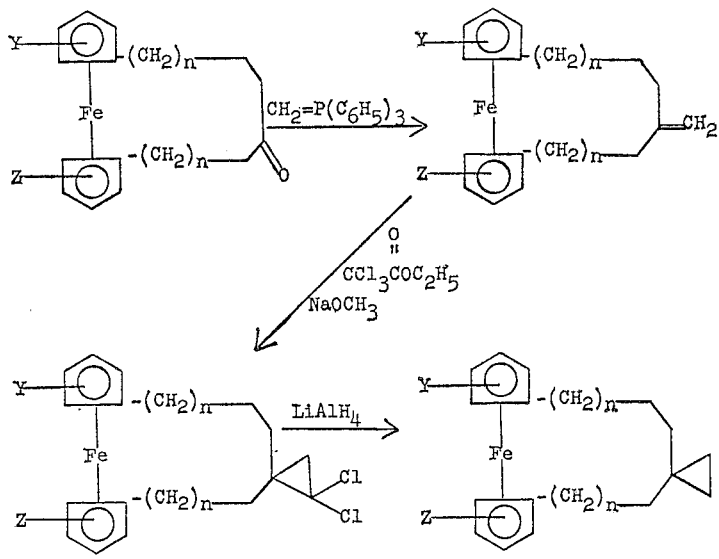

in which Y and Z are as previously described and represent groups which do not interfere with or partake in the reaction.

Representative of the compounds which may be prepared by the described process are the following:

β-methylene-1',1''-tetramethyleneferrocene,
Spiro[2,2 - dichlorocyclopropane - 1,β - (1',1'' - tetramethyleneferrocene)],
Spiro[cyclopropane - 1,β - (1',1'' - tetramethyleneferrocene)],
Spiro[2,2 - dichlorocyclopropane - 1,β - (1',1'' - pentamethyleneferrocene)],
Spiro[cyclopropane - 1,β - (1',1'' - pentamethyleneferrocene)],
Spiro[2,2 - dibromocyclopropane - 1,β - (1',1'' - hexamethyleneferrocene)], and
Spiro[cyclopropane - 1,β - (1',1'' - hexamethyleneferrocene)].

The compounds of Formula 2 are conveniently prepared by treating an appropriate ketone with a Grignard reagent to form β-hydroxy derivative, then treating that compound with potassium bisulfate at an elevated temperature (e.g. 130°) to form the corresponding exocyclic olefin and the Δβ,γ-β-methyl derivative. The latter compound is then treated with an ethyl trihaloacetate, such as ethyl trichloroacetate, to form the corresponding β,γ-dihalomethylene derivative and that compound treated with lithium aluminum hydride to form the β-γ-methylene derivative.

The process may be illustrated as follows:

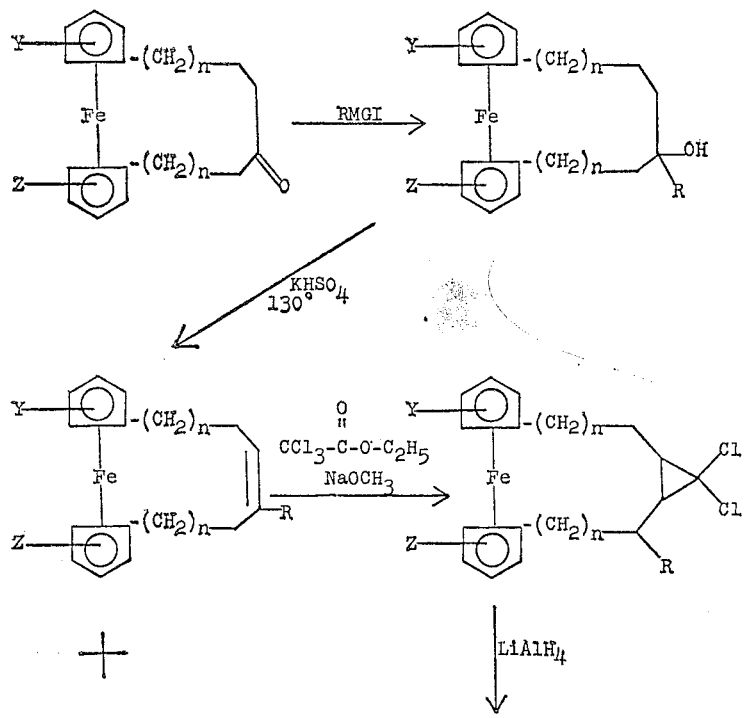

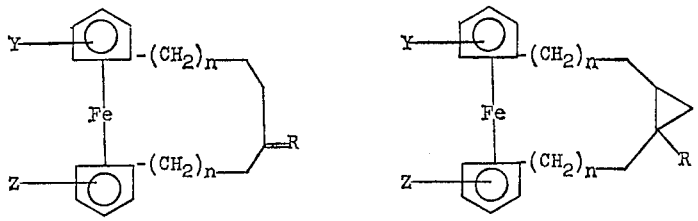

in which X and Y are groups which do not interfere with or partake in the reactions.

Representative of the compounds which may be prepared by the above process are the following:

Δβ,γ-β-methyl-1,1'-tetramethyleneferrocene,
β,γ - dichloromethylene - β - methyl - 1,1' - tetramethyleneferrocene,
β,γ - methylene - β - methyl - 1,1' - tetramethyleneferrocene,
β,γ - dibromomethylene - β - phenyl - 1,1' - pentamethyleneferrocene,
β,γ - methylene - β - phenyl - 1,1' - pentamethyleneferrocene,
β,γ - methylene - β - butyl - 1,1' - tetramethyleneferrocene,
β,γ - methylene - β - phenyl - 1,1' - tetramethyleneferrocene, and
β,γ - methylene - β - benzyl - 1,1' - tetramethyleneferrocene.

While for purposes of illustration the preparation of relatively simple compounds has been described, it will be readily apparent to those skilled in the art that different and more complex substituents than those described for R, X and Y may be attached to the molecules by conventional techniques.

The ferrocene derivatives of the present invention show promise as highly stable organo-iron sources for use in a variety of chemical procedures, e.g., polymerization reactions and the like. In addition, they can be used as petroleum additives such as anti-knock agents or combined with pharmaceutical diluents and formed into suitable oral or parenteral dosage forms such as capsules, tablets or solutions, and employed as hematinics for the treatment of iron deficiencies in animals. Such pharmaceutical dosage forms will generally contain approximately 5 to 500 mg. of the novel compounds.

The following examples illustrate the preparation of the novel compounds:

Example 1.—Δβ,γ-β-methyl-1,1'-tetramethyleneferrocene and β - methylene-1,1'-tetramethyleneferrocene (1:1 mixture)

A mixture of 2.44 g. (0.00904 mole) β-hydroxy-β-methyl-1,1'-tetramethyleneferrocene and 5.0 g. potassium bisulfate is heated at 160° for 1½ hours. The mixture is cooled, dissolved in benzene and chromatographed on silica gel. Elution with benzene gives 2.1 g. (91%) of Δβ,γ-β-methyl-1,1'-tetramethyleneferrocene and β-methylene-1,1'-tetramethyleneferrocene in the form of yellow crystals, M.P. 53–55°.

Analysis.—Calcd. for $C_{15}H_{16}Fe$: C, 71.45; H, 6.40; Fe, 22.20. Found: C, 71.67; H, 6.43; Fe, 22.21.

Example 2.—β-methylene-1,1'-tetramethyleneferrocene

To 100 ml. dry ether is added 7.0 g. (0.02 mole) methyltriphenylphosphonium bromide and 2.55 g. (0.016 mole) butyl lithium under nitrogen. When the mixture turns deep orange, 1.0 g. (0.004 mole) 1,1'-tetramethyleneferrocene is added as a dry powder. The mixture is stirred under nitrogen at room temperature for 2 hours, diluted with 100 ml. water, washed with water, dried and the solvent removed to give a gold oil. This was chromatographed over silica gel (petroleum ether) and 0.75 g. (75%) of β-methylene-1,1'-tetramethyleneferrocene in the form of a yellow solid is obtained, M.P. 66–69°.

Analysis.—Calcd. for $C_{15}H_{16}Fe$: C, 71.45; H, 6.40. Found: C, 70.94; H, 6.29.

Example 3.—β,γ-dichloromethylene-β-methyl-1,1'-tetramethyleneferrocene

To 200 ml. cyclohexane, 5.8 g. (0.107 mole) sodium methoxide and 2.7 g. (0.0107 mole) Δβ,γ-β-methyl-1,1'-tetramethyleneferrocene and β-methylene-1,1'-tetramethyleneferrocene (1:1 mixture) cooled to 0° C. is added 20.5 g. (0.107 mole) ethyl trichloroacetate. The mixture is stirred for six hours at 0° C., water (100 ml.) added and stirred with the mixture for 30 minutes, after which the organic layer is separated from the aqueous and washed with water and dried. Removal of solvent gives a yellow oil which is chromatographed over 200 g. silica gel. Eluting with petroleum ether and taking 50 ml. fractions effects separation. Fractions 1–12 are combined and crystallized from ethanol to give 0.750 g. (21%) of β,γ-dichloromethylene-β-methyl - 1,1' - tetramethyleneferrocene in the form of yellow crystals, M.P. 152–154°.

Analysis.—Calcd. for $C_{16}H_{16}Cl_2Fe$: C, 57.36; H, 4.81; Cl, 21.16; Fe, 16.67. Found: C, 57.02; H, 4.75; Cl, 21.36; Fe, 16.67.

Example 4.—Spiro[2,2-dichlorocyclopropane-1,β-(1,1'-tetramethyleneferrocene)]

Fractions 15–18 of Example 3 are combined and crystallized from ethanol to give 0.790 g. (22%) of a spiro[2,2-dichlorocyclopropane - 1,β - (1,1' - tetramethyleneferrocene)] in the form of yellow crystals, M.P. 95–96°.

Analysis.—Calcd. for $C_{16}H_{16}Cl_2Fe$: C, 57.36; H, 4.81; Cl, 21.16; Fe, 16.67. Found: C, 56.91; H, 4.72; Cl, 21.54; Fe, 16.72.

Example 5.—β,γ-methylene-β-methyl-1,1'-tetramethyleneferrocene

To 3.4 g. (0.09 mole) LAH in 100 ml. tetrahydrofuran (freshly distilled from LAH) is slowly added 1.2 g. (0.0037 mole) β,γ-dichloromethylene-β-methyl-1,1'-tetramethyleneferrocene dissolved in 70 ml. tetrahydrofuran. The mixture is stirred and refluxed for 43 hours after which it is cooled and a mixture of tetrahydrofuran: EtOAc (1:1) is added to destroy the excess LAH. The mixture is diluted with brine (200 ml.), extracted with EtOAc and dried. Removal of solvent gives a yellow solid which is recrystallized from methanol to give 0.69 g. (70%), β,γ-methylene-β-methyl-1,1'-tetramethyleneferrocene in the form of yellow crystals, M.P. 129–130°.

Analysis.—Calcd. for $C_{16}H_{18}Fe$: C, 72.21; H, 6.82. Found: C, 72.60; H, 6.72.

Example 6.—Spiro[cyclopropane-1,β-(1,1'''-tetramethyleneferrocene)]

To 100 ml. freshly distilled tetrahydrofuran and 3.0 g. (0.08 mole) LAH is added 1.17 g. (0.0035 mole) spiro[2,2 - dichlorocyclopropane-1,β-(1',1''-tetramethyleneferrocene)] in 70 ml. tetrahydrofuran dropwise at room temperature over a period of 15 minutes. The mixture is then stirred and refluxed for 20 hours. At the end of this time the system is cooled and a mixture of tetrahydrofuran: EtOAc (1:1) is slowly added to decompose the excess LAH. Water (200 ml.) is added and the mixture poured into 300 ml. brine, extracted with ethyl acetate, washed with brine and dried. Removal of solvent gives a yellow solid which is chromatographed over silica gel and eluted with petroleum ether to give 0.88 g. (95%) spiro[cyclopropane-1,β-(1′,1″-tetramethyleneferrocene)] in the form of a yellow solid which is crystallized from ethanol, M.P. 64.5–65.5°.

*Analysis.*—Calcd. for $C_{16}H_{18}Fe$: C, 72.21; H, 6.82; Fe, 20.99. Found: C, 71.89; H, 6.69; Fe, 21.03.

We claim:
1. A compound selected from the class consisting of compounds of the formulae

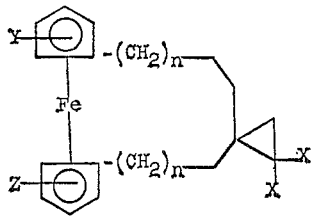

Formula 1

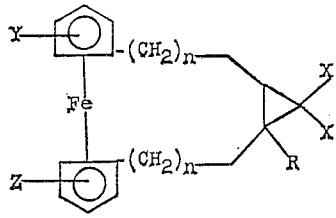

Formula 2 wherein R is hydrogen, an alkyl of 1 to 8 carbon atoms, an aryl or an aralkyl; X is hydrogen, bromo or chloro, $n$ is 0 to 1; and Y and Z are hydrogen, halo, trifluoromethyl or lower alkyl.

2. A compound of claim 1 in which X, Y and Z are hydrogen.

3. A compound of Formula 2 of claim 1 in which R is hydrogen or methyl, X is hydrogen or chloro, and Y and Z are hydrogen.

4. A compound of Formula 1 of claim 1 in which X is hydrogen or chloro, and Y and Z are hydrogen.

5. The method of preparing a compound of Formula 1 of claim 1 which comprises treating a compound of the formula

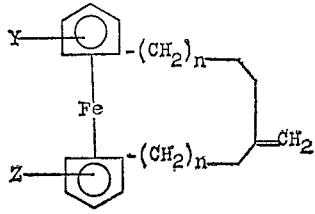

with an ethyl trihaloacetate to form a compound of the formula

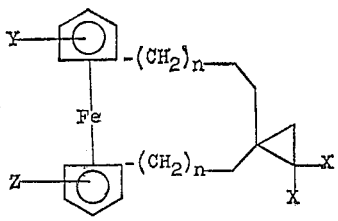

in which X is halo and all other symbols are as described in claim 1.

6. The process of preparing a compound of Formula 2 of claim 1 which comprises reacting a compound of the formula

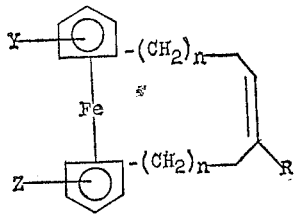

with an ethyl trihaloacetate to form a compound of the formula

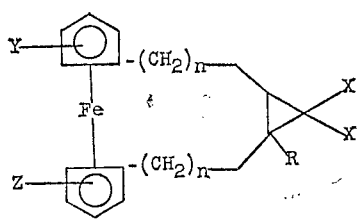

in which X is halo and all other symbols are as described in claim 1.

References Cited

Cottis et al., Chem. and Industry (London) No. 21, May 25, 1963, p. 860–1.

TOBIAS E. LEVOW, *Primary Examiner.*

A. P. DEMERS, *Assistant Examiner.*

U.S. Cl. X.R.

167—53, 68; 252—386, 431